INVENTORS
I. L. WILCOX
V. W. JEZERSKI
BY
*Young & Quigg*
ATTORNEYS

United States Patent Office 3,389,896
Patented June 25, 1968

3,389,896
METHOD AND APPARATUS FOR HEATING THERMOPLASTIC CONTAINERS FOR SEALING
Isaac L. Wilcox and Vincent W. Jezerski, Fulton, N.Y., assignors to Phillips Petroleum Company, a corporation of Delaware
Filed Oct. 10, 1966, Ser. No. 585,376
9 Claims. (Cl. 263—5)

This invention relates to the heating of containers for sealing. In another aspect, it relates to an improved method of and apparatus for heating a plastic-coated container for a hot-melt bonding of an end closure thereto.

The use of a thin film of protective plastic material, such as polyethylene, on the surface of a fibrous container has become widespread in the packaging field. This plastic material provides a smooth, attractive, highly protective, and liquid-proof coating for the container. A plastic like polyethylene has the additional advantage of being thermoplastic so it can be utilized as a hot-melt adhesive to form liquid-tight seals between the container and closures. The plastic coating becomes adhesive when heated to a temperature near or above its melting point; however, the maximum temperature must be limited to prevent injurious oxidation of the coating. For instance, to properly soften a plastic like polyethylene it must be heated to a temperature near or above its melting point, which is about 230° F., but less than 640° F. at which point deleterious oxidation is encountered.

Various methods have been used to heat the plastic coating to a softened or tacky state for joining and bonding a closure. A few of the important criteria for evaluating methods of heating the plastic coating are: first, uniform heating of the surface to which the closure is to be bonded is important. If any of the plastic in the sealing area has not been softened sufficiently to be adhesive, the seal between the closure and container may not be completely liquid tight. Second, only that section of the container surface which will be bonded to the end closure should be heated to an elevated temperature; otherwise, pinholing and other possible degeneration of the coating with resultant porosity could occur in the fluid-containing section of the container. Third, the temperature of the heat input must be controlled to prevent scorching, other surface discoloration of the container, or possible damage to the fibrous material of the container. This is important from both appearance, and consequently consumer appeal, and leakproof integrity viewpoints. Fourth, the method should be adaptable to containers having many transverse cross sectional shapes, e.g., circular triangular, polygonal, etc., and many longitudinal cross sectional shapes, e.g., sides parallel, tapered inwardly toward the bottom, tapered outwardly towards the bottom, etc. Another important criterion is that the heating of the plastic coating to a softened or tacky state should take place in a minimum amount of time and in an economical manner to obtain a high production rate at minimum cost.

Some methods for heating the plastic coating involve using electrical resistance heating means which transmit heat to the surfaces of the container and using shields to restrict the direct application of heat to that section of the container surface to which the closure is being bonded. Heating in this manner, although an acceptable technique for obtaining uniform application of heat to the container surfaces, limits production because of the time required to adequately soften the plastic coating.

Other methods for heating the plastic coating involve impinging fluids, such as hot, air, hot nitrogen or steam, directly on the inside surface of the container or on both the inside and outside surfaces.

This latter method provides the capability for a higher production rate over the electrical resistance heating since the heating medium is applied directly to the plastic coating, however, production rate is limited somewhat. A production increase with this method is dependent upon increased velocity of the impinging fluid or increased temperature of the fluid. Higher velocity of the impinging fluid could cause erosion of the plastic coating with consequential loss of integrity of the seal and possible degeneration of surface appearance. To obtain a reasonable production rate the hot fluid much be impinged on both surfaces. Because of the high flow rate, the flow pattern of the hot fluid on the outside surface of the container must be closely controlled to insure that no blemishes to the printing on the container are incurred. Increasing the temperature of the fluid is also limited by equipment constraints and involves significantly higher production costs.

Simplicity of the heating equipment to minimize repair and maintenance costs is also a design goal. The prior art methods involve equipment which inherently requires considerable repair and maintenance.

Accordingly, an object of this invention is to provide an improved method for heating the thermoplastic coating on a container for bonding.

Another object of this invention is to provide a method of heating the thermoplastic coating on a container in an economical, in a rapid, and in a simple manner adaptable to reliable, low cost, and high speed commercial production.

Still another object of this invention is to provide an apparatus suitable for carrying out the method of this invention for heating plastic-coated containers.

Further objects, advantages, and features of this invention will become apparent to those skilled in the art from the following detailed description and drawings wherein.

Prior to this time, direct impingement of the flame on the surface of a plastic-coated container was considered unfeasible because it was thought that a flame hot enough to soften the plastic within a short time period would either scorch the container or possibly initiate flaming of the plastic coating. A gas flame provides the capability for a rapid temperature increase of the plastic coating but is difficult to control.

We have found a novel method for heating a plastic-coated container comprising heating one surface of the container by impinging a flame directly thereon and radiating heat to the other surface by a thermal radiating means surrounding a portion of such surface. The thermal radiator can be heated by the same flame used to heat one surface of the container by directing such flame onto the thermal radiator prior to emplacement of a container for heating. By radiating the thermal energy absorbed by the radiator onto one surface of such container, the heat loss of the container during heating is minimized. This reduced heat loss permits a relatively low flame temperature for raising the temperature of the plastic coating to the desired level in a minimum time period. With our method the heat input requirement is reduced to a level where a flame, although hot enough for obtaining a high production rate, will not cause scorching of the container surface. If a flame were directed onto one surface of the container without a thermal energy radiator, scorching of the container would result if the production rate is maintained because the heat loss to the surroundings would have to be compensated by additional heat input to obtain the same temperature rise in the plastic coating in the same time period.

Our method meets all the criteria discussed previously. A flame can be uniformly applied to one surface of the container by a means which evenly distributes the flow pattern. The other surface, heated by radiant energy transmitted by the thermal radiator completely surrounding such surface, is uniformly heated. The area of flame impingement on the container surface can be easily restricted by providing a barrier. The heated portion of the other surface of the container is controlled by the width of the thermal radiator. As previously indicated, this present method permits a flame cool enough not to scorch the container. Irregular-shaped containers can be heated by the present method because of the mobility of the flame and by configuring a thermal radiator to be compatible with various container shapes. The use of a flame and thermal radiator provides a rapid temperature increase in the plastic coating in a minimum time because the heat loss of the container during heating is minimized. Providing flame directly to one surface of the container with a passive, thermal-radiating means heating the other surface can be accomplished with a simple apparatus thereby minimizing maintenance and repair costs.

Figure 1:
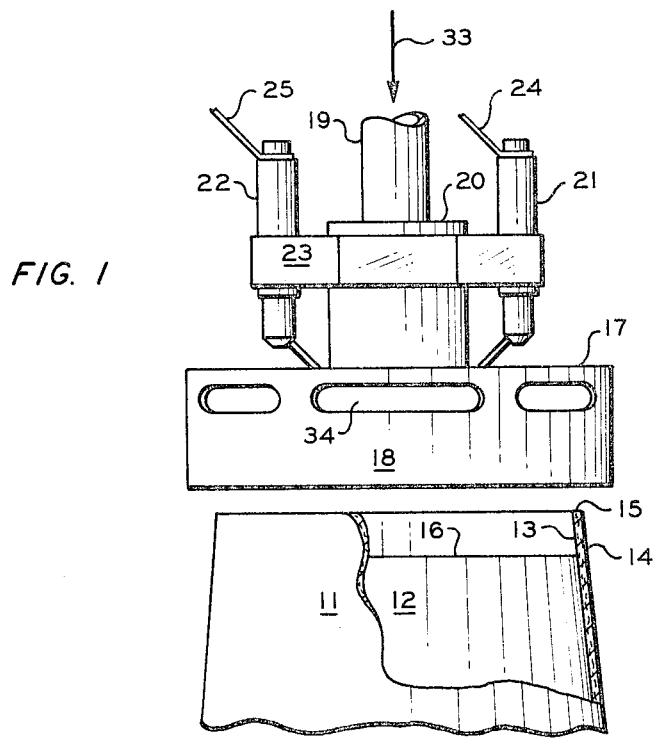
FIGURE 1 is an elevation view of the apparatus of our invention with a container, partially sectioned, in position prior to the heating operation.

To more fully explain our invention reference is now made to FIGURE 1 of the drawings which shows an open-ended, plastic-coated container 11 installed on a mandrel 12 in position for start in the heating operation. The inside surface area 13 of the container 11 between the end 15 of the container and the end 16 of the mandrel is the portion of the container which is heated to soften the plastic coating.

A heater head 17 includes a gas-fired burner assembly 18 which is mounted to a conduit 19 by a collar 20. The conduit 19 is connected to a supply of suitable combustible material, such as natural gas. Electrodes 21 and 22, used as an ignition source for the combustible material, are attached to collar 20 by bracket 23 and connected to a suitable source of electrical energy by electrical leads 24 and 25. The heater head 17 is moved towards the container 11 and mandrel 12 by some conventional means such as a hydraulic piston system or a pinion and rack arrangement, not shown.

Figure 2:
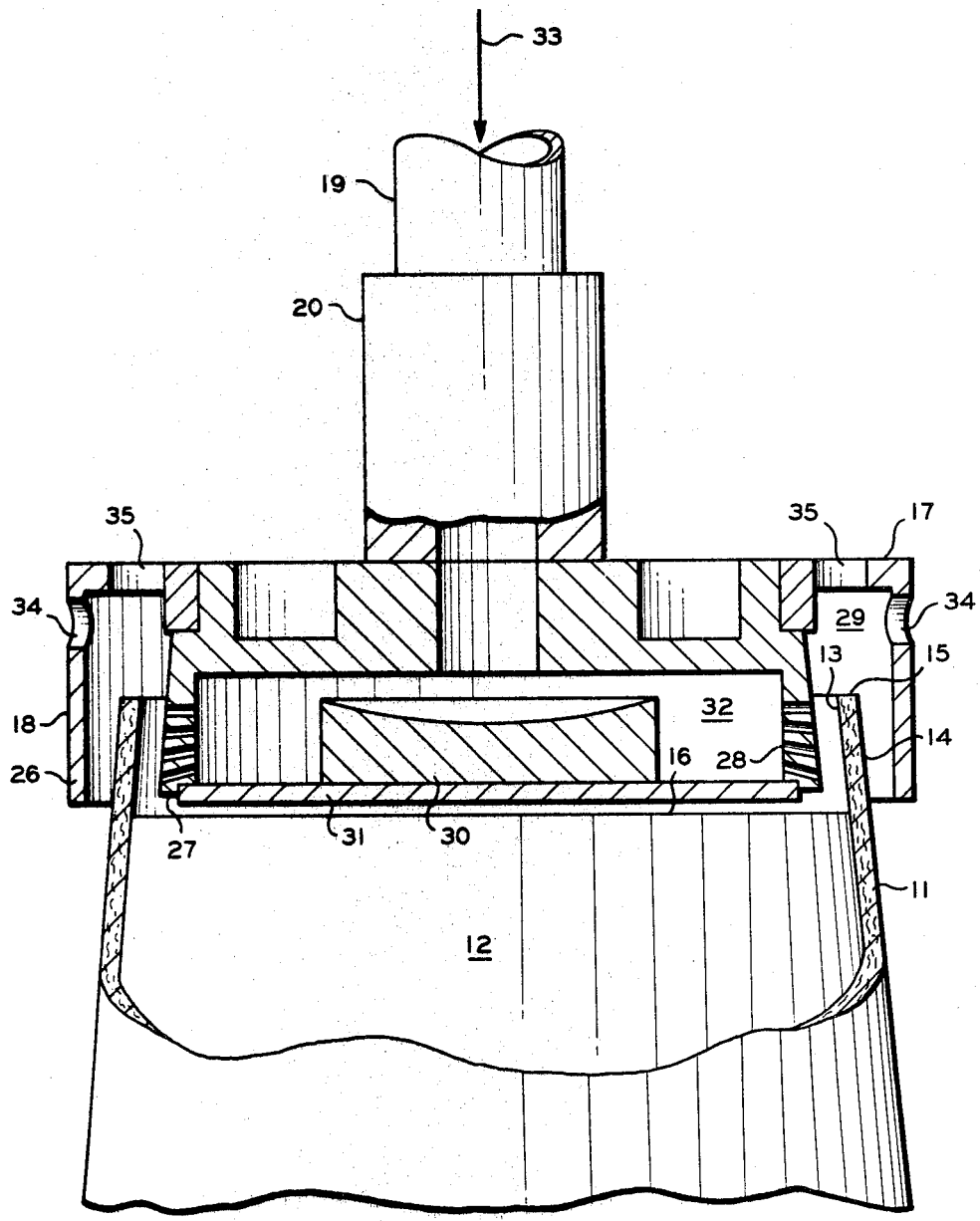
FIGURE 2 shows, in partial cross section, a container in place for heating.

The burner assembly 18, as shown in FIGURE 2, comprises an annular shroud 26, a nozzle 27 containing a series of small orifices 28, the shroud and nozzle arranged to form a trough-like opening 29, a concave baffle 30, a cover plate 31 and a plenum chamber 32 supplied with combustible products through conduit 19.

The combustible material enters the heater head 17 through conduit 19 as represented by arrow 33. During startup of the heater head the combustible material is ignited by electrodes 21 and 22, supplied electrical energy through electrical leads 24 and 25 (FIGURE 1). The combustion gases, which flame when mixed with air and ignited, are ejected outwardly from the plenum chamber 32 through orifices 28 and towards thermal-radiating shroud 26 by virtue of the internal pressure in the plenum chamber being greater than atmospheric.

Before a container is in place for heating as shown in FIGURE 2 the flame impinges directly on the shroud 26. The shroud is made of a material with high thermal absorptivity and emissivity, such as steel or a ceramic, in order to effect maximum thermal absorptivity while the flame is impinging thereon and maximum thermal radiation to the container surface when it is in place for heating. The baffle 30 is configured and positioned so as to diffuse the incoming gases thereby effecting uniform distribution of flow through the nozzle orifices.

The electrodes 21 and 22 provide a safe and reliable technique for igniting the combustible material. The electrical signal to the electrodes is terminated after ignition of the combustible material. The burner continues to operate until the flow of combustible material through conduit 19 is shut off.

After the burner 18 is started and the container 11 is in position on mandrel 12, as shown in FIGURE 1, the heater head 17 is lowered and the burner 18 is positioned over the end of the container as shown in FIGURE 2. The heater head is adjusted so that a small gap exists between the end 16 of mandrel 12 and cover plate 31 when the heater head is lowered. This insures proper engagement of the heater head onto the container and substantially limits heating to the desired section of the container only. Heater head 17 is adjusted, by a means not shown, to obtain the desired engagement and surface area heating.

The section of the container between the end 15 of the container and the end 16 of the mandrel is positioned in the trough-like opening 29 between the shroud 26 and the nozzle 27. The flame impinges on surface 13 of the container 11 and the mandrel 12 acts as a barrier to prevent the flame from impinging on any other portion of the container.

To prevent the flame from licking around the end 15 of the container and impinging on the outside surface 14 of the container, slots 34 and holes 35 are provided in the shroud 26 as vents for the hot products of combustion. These slots and holes also provide oxygen inlet areas to sustain combustion when the heater head is engaged onto the container and mandrel thereby allowing fine adjustment of the flame and preventing the flame from being extinguished when the heater head is engaged onto the container and mandrel. A premix of gas and air or gas and oxygen may be introduced through conduit 19 if desired.

Figure 3:
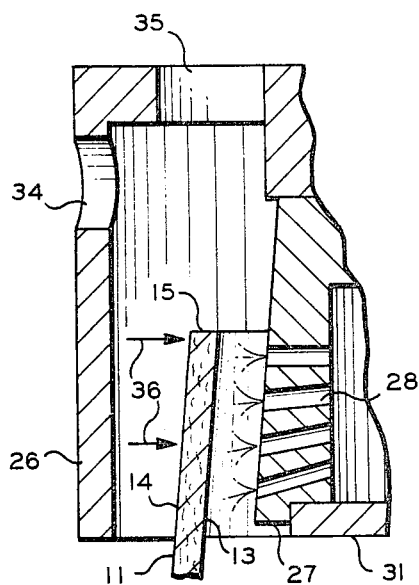
FIGURE 3 illustrates, in detail, our method of heating a plastic-coated container.

FIGURE 3 illustrates, in detail, the method of our invention for heating a container. The inside surface of the container is heated by the direct impingement of flame. Thermal energy absorbed by the shroud between container heating cycles by the impingement of flame and hot gases thereon is radiated onto the outside surface 14 of the container as illustrated by solid arrows 36.

After completion of the heating cycle, the heater head is retracted from the container and mandrel. The flame impinges on the shroud until the heater head is again engaged onto another container which has been moved into position for the heating cycle as described. The heated container is moved to another position for installation of a plastic-coated end closure. A plastic-coated end closure with a peripheral flange is inserted inside the container so that one surface of the flange contacts the inside surface of the container while the plastic coating is still in a softened state. The end of the container is then folded inwardly over the flange of the closure and the surfaces pressed together by conventional means to form a bond between the inside surface of the container and the flange of the closure.

For purposes of discussion and illustration the heating source has been described as a flame. It is to be understood that other heat sources may be utilized. Use of a thermal energy radiating means encompassing one surface of a container reduces heat losses to the surroundings thereby allowing either a production increase with other heat source means or a reduction in the heat input requirements at the same production rate with other heat source means. For instance, the production rate with hot air impingement on one surface of the container, when combined with a thermal energy radiator, can be increased because of the reduction of heat loss to the surroundings.

Also, specific reference has been made to polyethylene-coated containers, but it is to be understood that this invention is not limited to such containers. Any coating which is a hot-melt adhesive is operable in the present invention if it reaches its softened state in a time or at a temperature which is non-destructive to the material of the container to which it is applied. Polypropylene, polyamide resins, and vinyl resins are examples of other coatings which are hot-melt adhesives. Other operable hot-melts and specific adhesive resin as coatings within these broad classes will be readily apparent to those skilled in the art.

Various other modifications and alterations of this invention will become apparent to those skilled in the art without departing from the scope and spirit of this invention and it should be understood that the latter is not necessarily limited to the aforementioned discussion.

We claim:

1. A method of heating thermoplastic-coated containers to soften the plastic for hot-melt sealing which comprises heating a section of one surface of a container by the direct application of thermal energy from a heat source and heating a section of another surface of such container by radiation of thermal energy absorbed from said heat source.

2. The method of claim 1 wherein the said heat source comprises a burning combustible material.

3. The method of claim 1 wherein the said direct application of thermal energy is by conduction.

4. An apparatus for heating thermoplastic-coated containers to soften the plastic for hot-melt sealing comprising, in combination, means for supporting a container, a movable heater head containing a heat source means and a thermal energy radiating means, and means to position said heater over end of said container so that a portion of one surface of the container is heated directly from said heat source means and a portion of the other surface of said container is heated from the radiation of thermal energy from said thermal energy radiating means.

5. The apparatus of claim 4 wherein the heat source means comprises a gas-fired burner connected to a supply of combustible material and a means for igniting said combustible material and wherein the said thermal energy radiating means comprises a shroud constructed of material with high emissivity and thermal energy absorptivity which surrounds a section of one surface of said container.

6. The apparatus of claim 4 wherein said heater head comprises a plenum chamber, connected to a conduit at one end, with annular side walls forming a nozzle having a series of apertures therein; a cover plate having a concave baffle attached thereto mounted to said side walls so as to form the other end of said plenum chamber; and a heat-radiating shroud attached to the outside of said side walls at the end of said combustion chamber to which said conduit is connected, a portion of said shroud spaced from said side walls so as to form an annular, trough-like opening, the portion of said shroud adjacent to said side walls and the portion of said shroud spaced from said side walls having apertures therein.

7. The apparatus of claim 5 wherein the said gas-fired burner comprises a nozzle positioned in said heater head so as to direct a flame onto a portion of said container through apertures in said nozzle.

8. Apparatus of claim 5 wherein said heater head includes a means for preventing the flame from impinging on both surfaces of said container and a means for adjustment of flame temperature.

9. The apparatus of claim 8 wherein said means for preventing the flame from impinging on both surfaces of the container and said means for adjustment of flame temperature comprises said shroud having apertures therein.

References Cited

UNITED STATES PATENTS

| | | | |
|---|---|---|---|
| 1,345,188 | 6/1920 | Howlett | 263—5 |
| 3,147,794 | 9/1964 | Shupe et al. | 158—13.6 |

FREDERICK L. MATTESON, Jr., *Primary Examiner.*

R. A. DUA, *Assistant Examiner.*